US006530177B1

United States Patent
Sørensen

(10) Patent No.: US 6,530,177 B1
(45) Date of Patent: Mar. 11, 2003

(54) DOUBLE-CHAIN WINDOW OR DOOR OPERATOR

(75) Inventor: Jens Jørren Sørensen, Copenhagen (DK)

(73) Assignee: VKR Holding A/S, Søborg (DK)

( * ) Notice: Subject to any disclaimer, the term of this patent is extended or adjusted under 35 U.S.C. 154(b) by 0 days.

(21) Appl. No.: 09/937,728

(22) PCT Filed: Mar. 30, 2000

(86) PCT No.: PCT/DK00/00158

§ 371 (c)(1),
(2), (4) Date: Dec. 4, 2001

(87) PCT Pub. No.: WO00/60202

PCT Pub. Date: Oct. 12, 2000

(30) Foreign Application Priority Data

Mar. 31, 1999 (DK) .......................................... 1999 00443

(51) Int. Cl.[7] ............................................... E05F 11/00
(52) U.S. Cl. ........................................................ 49/325
(58) Field of Search ....................... 49/324, 325; 59/78, 59/84

(56) References Cited

U.S. PATENT DOCUMENTS 4,726,247 A 2/1988 Hormann
4,819,495 A * 4/1989 Hormann ..................... 49/325
5,271,182 A 12/1993 Greisner et al.
5,355,643 A * 10/1994 Bringolf ...................... 52/108

FOREIGN PATENT DOCUMENTS

| EP | 0 600 105 | 6/1994 |
| EP | 0 620 890 | 4/1998 |
| GB | 422781 | 1/1934 |

* cited by examiner

*Primary Examiner*—Jerry Redman
(74) *Attorney, Agent, or Firm*—Venable; Chad C. Anderson; John P. Shannon

(57) ABSTRACT

A door or window operator includes a motor-driven double-chain operator with two chain members in a substantially closed operator housing separately in engagement with a rotating drive member and joined in a back-to-back arrangement. The chain members include links having hinge parts with parallel rotational axes oriented transversely to the direction of propagation of the chain member for engagement with neighboring chain links in the same chain member and having a back surface provided with zip engagement members for engaging corresponding engagement members on the back surfaces of adjacent links in the other chain member for securing the chain members in the joined operator member against displacement transversely to the opening/closing direction. The chain members allow a mutual displacement between neighboring links in the direction of the rotational axes and the separate chain paths extend only in a part of the housing in a plane common with the outlet openings.

16 Claims, 5 Drawing Sheets

DOUBLE-CHAIN WINDOW OR DOOR OPERATOR

BACKGROUND OF THE INVENTION

The present invention relates to an operator for opening and closing a door or a window, comprising a motor-driven double-chain operator with two chain members, both flexible in one direction only, said chain members being accommodated in the closed position of the door or the window, in a substantially closed operator housing, in which the chain members are individually in engagement with a rotating drive member in communication with outlet openings for the chain members, and separate chain paths connected therewith, from which the chain members may be joined in a back-to-back arrangement for the provision of a rigid operator member, the two chain members being composed of chain links having hinge parts with parallel rotational axes oriented transversely to the direction of propagation of the chain member in the associated chain path in the operator housing for engagement with neighbouring chain links in the same chain member and having a back surface provided with zip-like engagement members for engagement with corresponding engagement members on the back surfaces of adjacent chain links in the other chain member for securing the chain members in the joined operator member against displacement transversely to the opening/closing direction, whereby the substantially closed operator housing and coupled free ends of the chain members are connected with profile members of the frame and sash structures of the door or the window, said profile members being positioned opposite one another and extending transversely to the opening/closing direction of the door or the window.

GB-A-422,781 and U.S. Pat. No. 5,271,182 disclose window operators of this type with a double-chain operator, in which the two chain members in the housing are guided in separate chain paths, which throughout their entire length are bound to extend in a common plane, whereby a desired length of the operator member composed of the chain members requires a comparatively bulky housing.

BRIEF SUMMARY OF THE INVENTION

On this background, the object of the invention is to provide a door or window operator of the type described, by means of which the operator housing for a given desired length of the operator member may be made substantially more compact.

To meet this object a door or window operator according to the invention is characterized in that in each chain member the hinge parts of the chain links are designed such that during propagation of the chain member in the operator housing a mutual displacement is allowed between neighbouring chain links in the chain member in the direction of the rotational axes, and that the separate chain paths only in a part of the housing extend in a plane common with the outlet openings.

Due to this mutual displaceability of the chain links the chain paths are not bound to extend in one plane, but may extend in two or more levels partly overlapping one another, the chain members being movable between such different levels during their propagation in the chain paths, for instance over ramp like connecting sections. Hereby, a substantially bigger freedom of choice in respect of the design of the operator housing is obtained and the possibility of a more compact design of the housing for a given desired length of the operator member composed of the chain members.

It should be noted in this connection that propagation of a single-chain in two levels in an operator housing is known per se from EP-BL-0 600 105 and EP-B1-0 620 890.

In a preferred embodiment the hinge parts in each chain link comprise a pin member of substantially hook-shaped cross section and a guide member formfitting therewith, said guide member being open at at least one of a pair of opposite side faces of the chain link.

The mutual displaceability of the chain links in each of the two chain members has the effect that the individual chain links in a chain member are not in themselves in secured connection with the neighbouring chain links, but such a secured connection is established partly by the design of the operator housing and the chain paths, which limit the mutual displaceability of the chain links, partly through the locking engagement between two chain members when joined into the rigid operator member.

By a comparatively simple and appropriate design of the operator housing, said common plane may be formed by a lower housing part, one chain path extending in its entirety in said lower housing part, whereas the second chain path over a substantial part of its length extends in an upper housing part overlapping said one path and continuing in said common plane via a ramp.

Particularly in case of comparatively big and heavy windows, it would normally be preferred to use more than one operator. By means of an alternative embodiment of a door or window operator according to the invention, it becomes possible to place such operators with a compact design of the housing appropriately at the corners between the bottom and side members of the frame and sash structures due to the fact that outside said part of the housing the chain paths are helically shaped with an axis substantially perpendicular to said common plane. The chain paths may then be accommodated in chain storages which are mounted on the frame side members or possibly built into them.

Further advantageous embodiments are stated in the dependent claim.

BRIEF DESCRIPTION OF THE DRAWINGS

The invention will now be explained in the following with respect to the schematic drawing, in which.

DETAILED DESCRIPTION OF THE DRAWINGS

Figure 1:
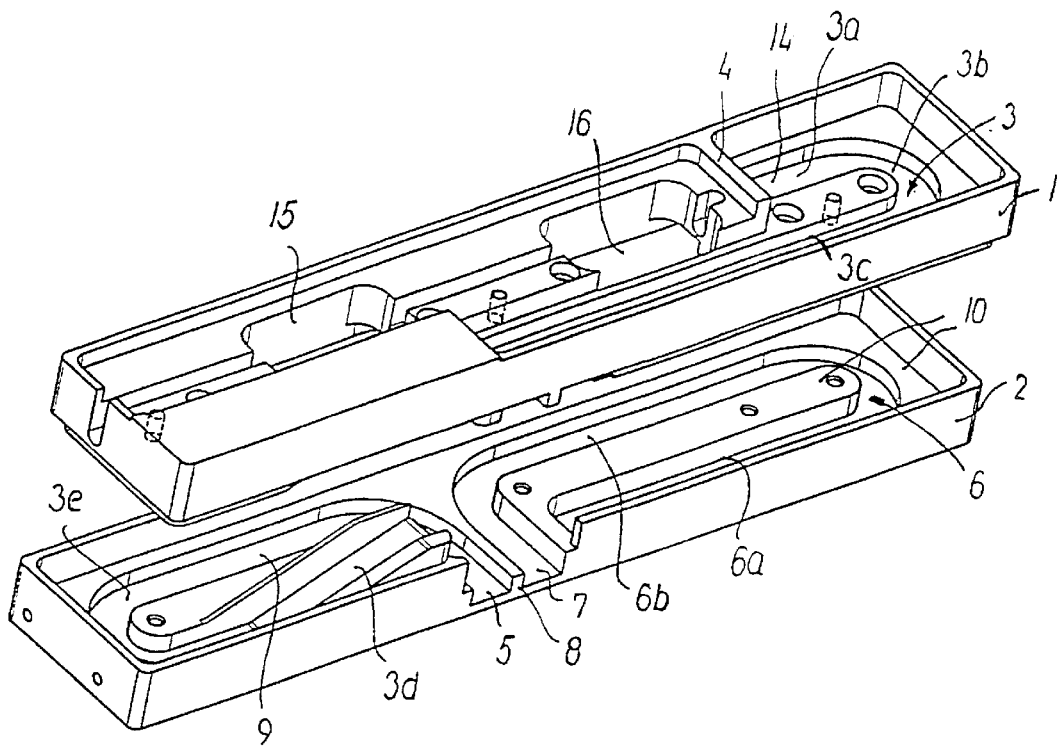
FIG. 1 shows sections of the operator housing in an embodiment of a window operator according to the invention, FIG. 2 the housing shown in FIG. 1 with a built in drive mechanism for chain members, FIG. 3 an enlarged section of FIG. 2 for illustrating the propagation of a chain member in a chain path having differing levels, FIG. 4 a further enlarged section for illustration of the engagement of a drive member with a chain link in a chain member, FIGS. 5–7 an embodiment of a single chain link, FIG. 8 an enlarged section for illustration of the joining of two chain members into a rigid operator member, and FIG. 9 a helically wound chain storage.
Figure 2:
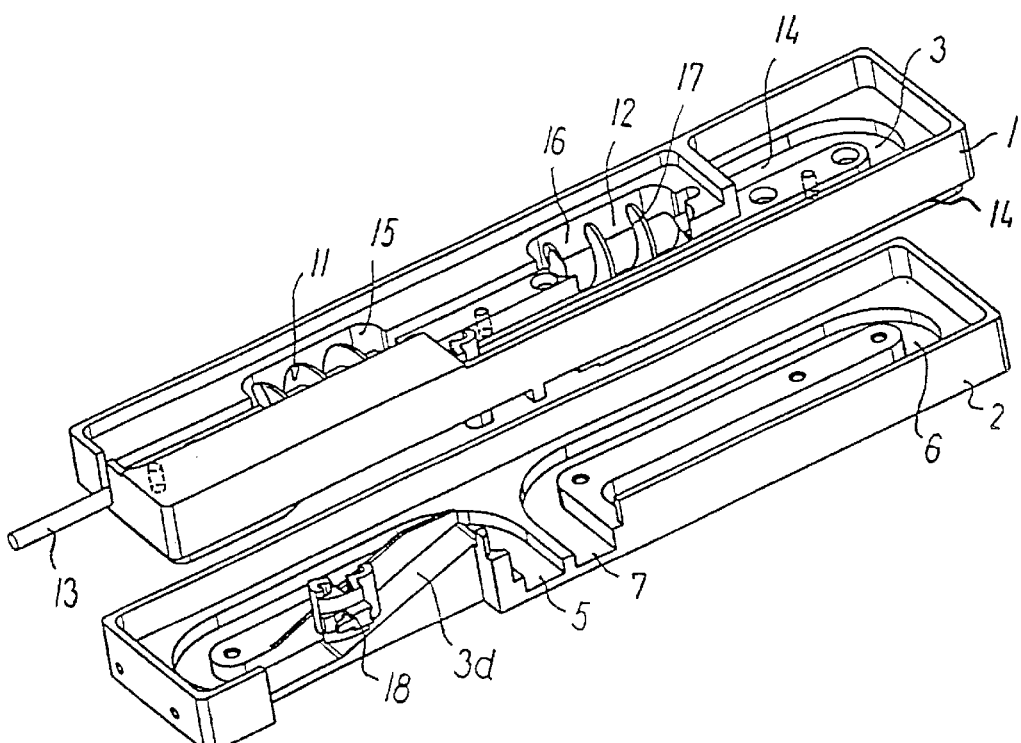
Figure 3:
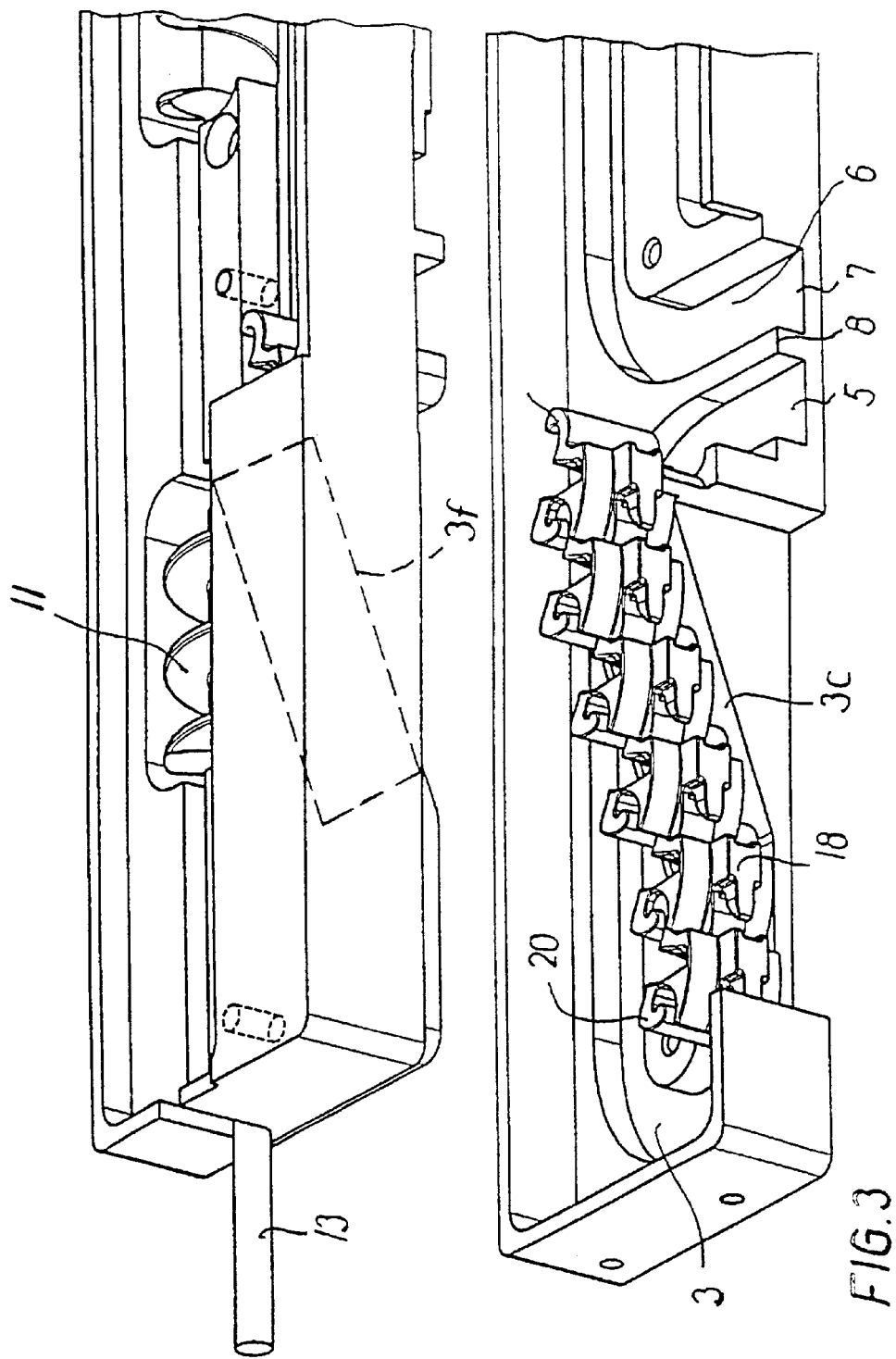

The operator housing shown in FIGS. 1–3 is composed of an upper and lower housing part 1 and 2, which may be made as cast shell profiles, and of which the upper housing part 1 for the provision of a substantially closed housing is closed upwards by a cover plate (not shown). When used as a window or door operator for a window or a door with an openable sash structure, the operator housing will normally be mounted on a sash or frame profile which is perpendicular to the opening/closing direction, whereas the free end of the double operator member, which is composed of the chain members described in detail in the following, will be mounted on the opposite frame or sash profile as known per se from the above-mentioned U.S. Pat. No. 5,271,182.

In the upper housing part 1 a chain path 3 is provided, which from an interior partition wall 4 defining a space in the housing part 1 intended for accommodation of drive members extends through a first linear section 3a, a substantially semicircular transition section 3b at one end of the housing part 1 and a section 3c in parallel with a side wall of the housing part towards a ramp 3, through which the section 3c joins a section 3e provided in the lower housing part 2, said section 3e ending through a 90° bend in a chain outlet opening 5.

In the section of the lower housing part 2 not occupied by the ramp 3d and the section 3e of the chain path 3, a second chain path 6 is provided having two part sections 6a, 6b in parallel with side walls of the housing part 3, said part sections being connected through a substantially semicircular transition section 6c, the part section 6b ending through a 90° bend in a chain outlet opening 7 positioned side-by-side with the chain outlet opening 5 separated therefrom by a partition wall 8 constituting a separation between the chain path 6 and the section 3e of the chain path 3 extending in the lower housing part 2.

The bends of the chain path sections 3e and 6b is made with substantially the same radius of curvature as the semicircular transition sections 3b and 6c.

Even though the chain paths 3 and 6 in FIGS. 1 and 2 are shown with different length, it should be understood that they have preferably mainly the same length, which may be obtained by increasing the length of the section of the lower housing part 2, which comprises the part sections 6a–6c of the chain path 6.

The chain paths 3 and 6 provided in the housing parts 1 and 2 thus extend only over a part of their length in a plane common with the outlet openings 5 and 7, said plane consisting of the bottom 9 of the lower housing part 2.

In the embodiment shown, the chain paths 3 and 6 are substantially throughout their length limited by elevated portions 10 forming guides for the propagation of the chain members described in the following. The guiding of the chain members during the propagation on the chain paths 3 and 6 may, however, take place in a different manner, for instance by means of rib-shaped guide means or the like provided in the bottom of the chain paths or in upper walls therefor, for instance in the inclined upper wall 3f for the ramp section 3d for engagement with corresponding guide members in one or both opposite side surfaces 23 and 24 of the chain members 18.

The drive members accommodated in the upper housing part 1 comprise in the embodiment shown two worm members 11 and 12 with opposite pitch and positioned in the housing on each side of the outlet openings 5 and 7. As shown in FIG. 2, the worm members 11 and 12 are placed on a common shaft 13 extending in the longitudinal direction of the housing and positioned such relative to the partition wall 14 formed by the bottom 14 of the upper housing part 1 that the worm members 11 and 12 through openings 15 and 16 are brought into engagement with two respective chain members during their propagation in the part sections 3d and 6b of the chain paths 3 and 6.

The worm members 11 and 12, which through the common shaft 13 is connected with a drive motor (not shown) with reversible rotational direction, are as shown provided with helical ribs 17, which, as explained in detail in the following, engage a helical groove in each side surface of each of a number of successive chain links in the two chain members.

In FIG. 2 and in the enlarged section in FIG. 3 it is also shown how a single chain link 18 and a number of coherent chain links is guided via the ramp 3d from the chain path sections 3a–3c positioned in the upper housing part to the section 3e situated in the lower housing part 2. As will be seen from FIG. 3, but explained in detail in the following, the chain links are designed with hinge parts 19 and 20 with parallel rotational axes oriented transversely to the direction of propagation in the associated chain path, such that each chain link 18 via these hinge parts 19 and 20 is in engagement with neighbouring chain links in the same chain member.

According to the invention these hinge parts 19 and 20 are, as will be explained in the following, designed such that during the propagation of the chain members in the operator housing, as shown in FIG. 3, they allow a mutual displacement between neighbouring chain links 18 in the direction of the rotational axes.

Figure 4:
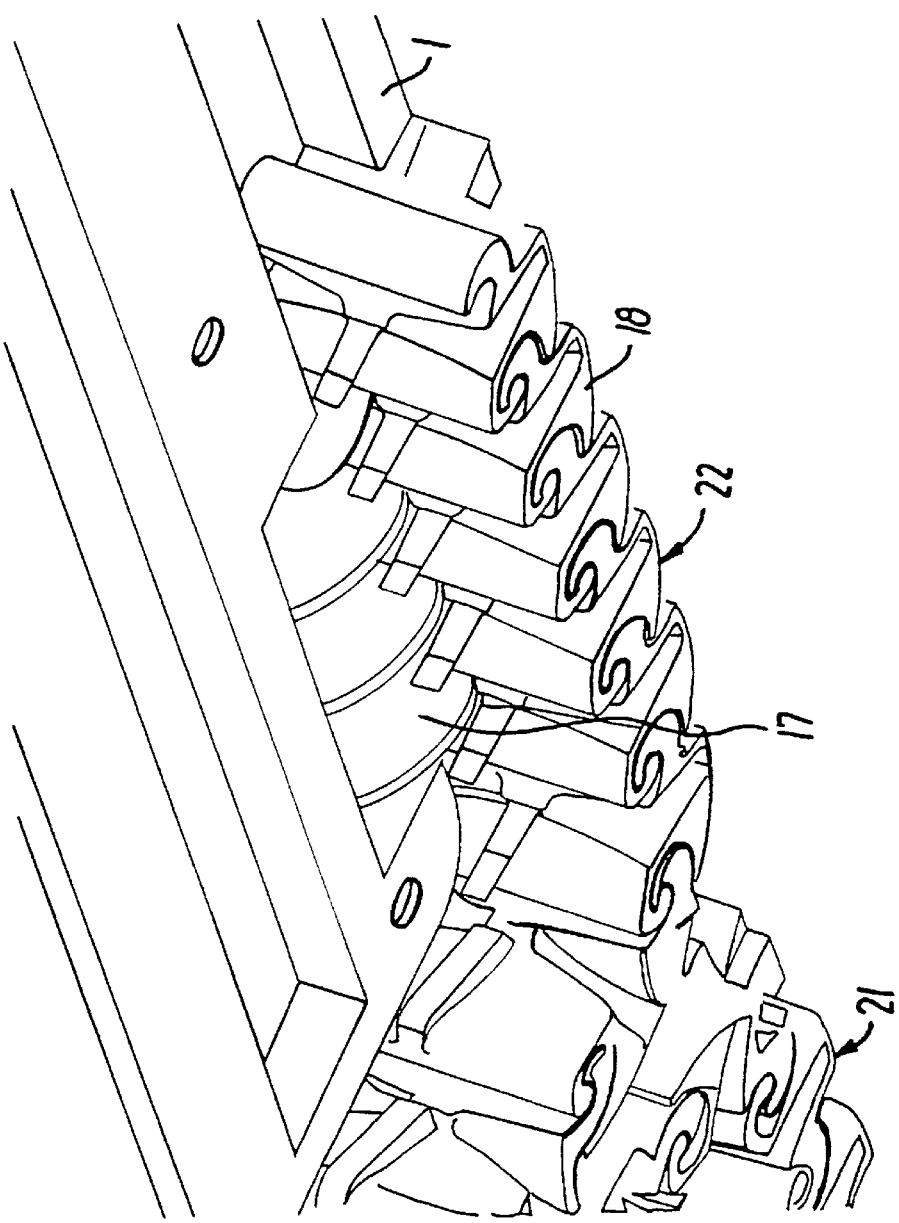

The engagement between a worm member 11 and a number of successive chain links 18 in one of the two chain members 21 and 22 are illustrated in the enlarged section in FIG. 4.

Figures 5, 6:
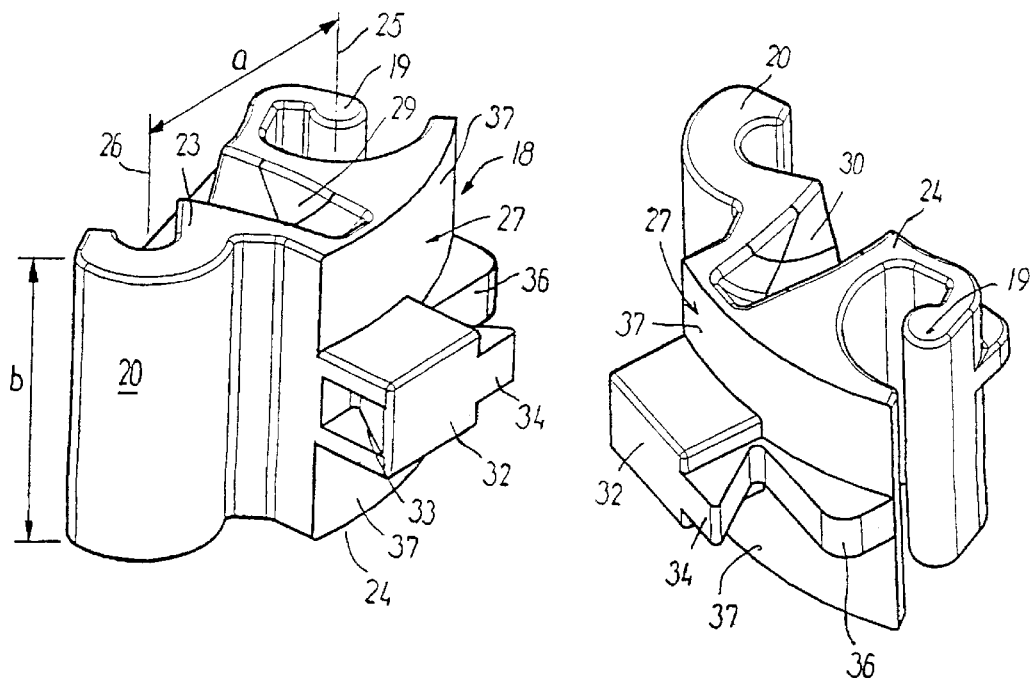
Figure 7:
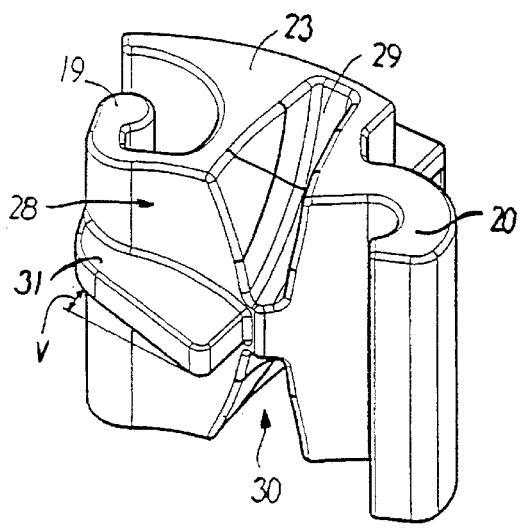

In the embodiment shown in FIGS. 5–7 of a chain link 18, the hinge parts comprise a pin member 19 with substantially hook-shaped cross section and a guide member 20 formfitting therewith, which, in the embodiment shown, is open at two opposite side surfaces 23 and 24 of the chain link. The guide member 20 may alternatively be closed at the end facing upwards of the chain member advanced on the chain path 3, the displaceability, which is a prerequisite for the invention, being still attainable. The pin member 19 and the guide member is oriented in such a manner that the rotational axes of the chain link 18 become substantially perpendicular to the side surfaces 23 and 24, and to make the displacement between the chain links 18, shown in FIG. 3, possible during the propagation of the chain member 21 on the ramp section 3d, the pin member 19 and the guide member 20 have a length b, which is adapted relative to the distance a between the two rotational axes 25 and 25 for a chain link 18 in such manner, that the chain member 21 may be fed from the upper housing part 1 to the lower housing part 2 via a ramp section 3d having a comparatively high pitch, for instance, as shown in FIG. 2, approx. 20°, the mutual engagement between the individual chain links being retained. In the embodiment shown the length b is slightly bigger than the distance a.

Figure 8:
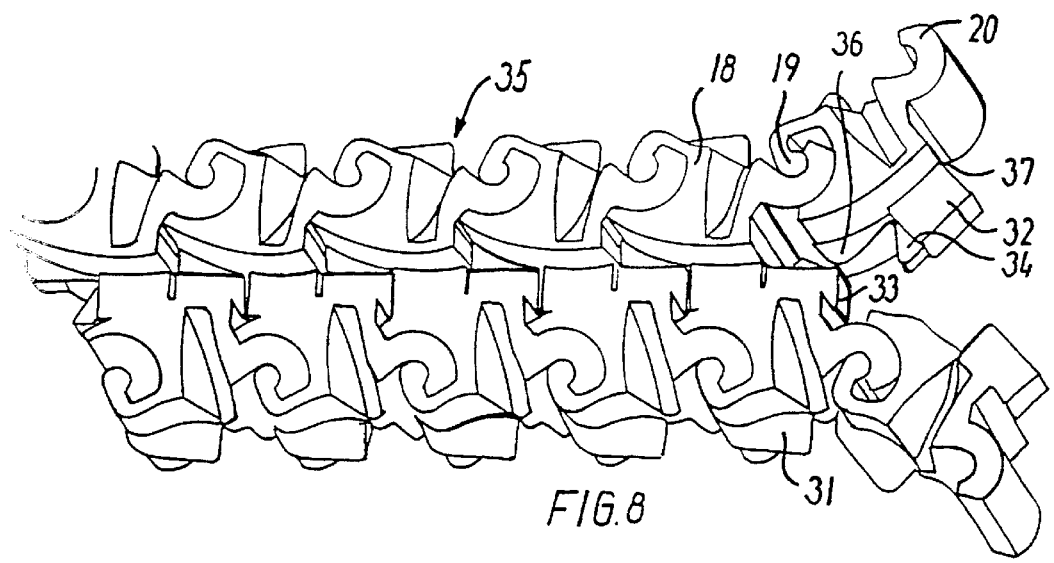

Substantially perpendicular to the side surfaces 23 and 24, each chain link 18 has a back surface 27 and relative thereto an opposite guide surface 28. Since the chain links in the embodiment shown are mutually identical in the two chain members 21 and 22, but are positioned in mirror symmetry as shown in FIG. 8, two grooves 29 and 30 are provided in each chain link 18 for engagement with the worm members 11 or 12. Each of the grooves 29 and 30 are helically shaped with a pitch corresponding to the pitch of the helical ribs 17 on the worm members 11 and 12 and are open towards partly each of the respective side surfaces 23 and 24, towards partly the respective guide surface 28 opposite the back surface 27.

In the guide surface 28 each chain link 18 is in the embodiment shown provided with a guide rib 32 for abutment on the adjacent elevated portion 10 in the chain path 3 or 6 in question. As shown i FIG. 7, the guide rib 31 is inclined under an angle v corresponding to the pitch of the ramp section 3d in the operator housing, such that the chain links 18 in the chain member advanced via the chain path 3, during the propagation on the ramp section 3d maintains the same orientation of the rotational axes 25 and 26 as in the plane sections 3a–3c and 3e of the chain oath 3. Instead of the guide rib 31, the chain links 18 may be provided with other means for safe guidance of the chain members 21 and 22 on the chain paths 3 and 6, and in this connection also on the ramp section 3d.

With a view to engagement with chain links in the other chain member, zip-like engagement means are provided in the back surface 27 of each chain link 18 midway between the side surfaces 23 and 24, said engagement means having in the embodiment shown the shape of a protruding cam 32, which at one end is provided with a recess 33 and at the other end with a pin member 34, said recess and pin member engaging, at the joining of chain links 18 from the two chain members 21 and 22 into the double operator member 35, as shown in FIG. 8, a pin member 34 and a recess 33 in the back surfaces 27 of two adjacent chain members 18 in the other chain member, respectively.

In extension of the protruding cam 32, at the front end thereof, seen in the direction of propagation, the back surface 27 is provided with an abutment 36 for the protruding cam 32 from the back surface 27 on the adjacent chain link 18 in the second chain member lying immediately in front of the joined operator member.

On each side of the protruding cam 32 the back surface of each chain link 18 has the shape of a curved guide surface 37 with a curvature corresponding to the semicircular transition sections 3b and 6c of the chain paths 3 and 6 and the corresponding curve radius of the corners between the parts of the chain path sections 3d and 6b extending in the longitudinal direction of the operator housing and perpendicular thereto in connection with the outlet openings 5 and 7.

Figure 9:
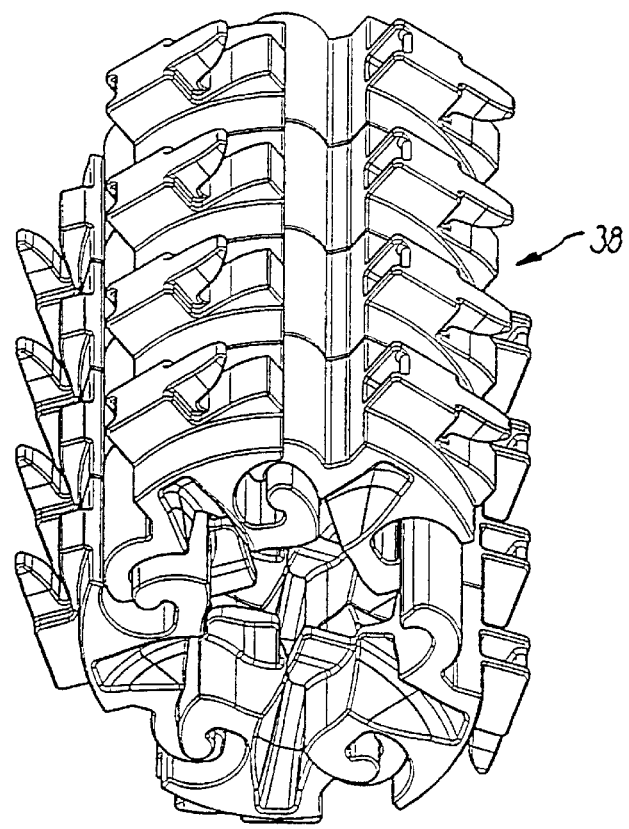

The particular design of the chain links 18 according to the invention opens up the possibility of other embodiments of the chain paths and consequently of the operator housing than those shown in FIGS. 1–3. Thus, each chain path may outside the part of the operator housing, in which they as a consequence of the joining of the chain members into a double operator member have to extend in a common plane, as shown in FIG. 9 in respect of a single chain member 38, be helical with an axis substantially perpendicular to the common plane, in which the two chain members are joined into a double operator member.

I claim:

1. An operator for opening and closing a door or a window having frame and sash structures, the door or window being movable from an open or closed position in an opening or closing direction, the operator comprising a motor-driven double-chain operator with two chain members (21, 22), both flexible in one direction only, said chain members being accommodated in the closed position of the door or the window, in a substantially closed operator housing, in which the chain members (21, 22) are individually in engagement with a rotating drive member (11, 12) in communication with outlet openings (5, 7) for the chain members, and separate chain paths (3, 6) connected therewith, from which the chain members (21, 22) may be joined in a back-to-back arrangement for the provision of a joined operator member, each of the two chain members (21, 22) being composed of chain links (18) having hinge parts (19, 20) with parallel rotational axes (25, 26) oriented transversely to a direction of propagation of the respective chain member in the associated chain path in the operator housing for engagement with neighbouring chain links in the respective chain member, the chain links of each of the chain members having back surfaces (27) provided with engagement members (32) for engagement with corresponding engagement members on the back surfaces of adjacent chain links (18) in the other chain member for securing the chain members in the joined operator member against displacement transversely to the opening and closing directions, whereby the substantially closed operator housing and coupled free ends of the chain members are connected with profile members of the frame and sash structures of the door or the window, said profile members being positioned opposite one another and extending transversely to the opening and closing directions of the door or the window, characterized in that in each chain member (21, 22) the hinge parts (19, 20) of the chain links (18) are designed such that during propagation of the respective chain member (18) in the operator housing a mutual displacement is allowed between neighbouring chain links (18) in each chain member (21, 22) in a direction of the rotational axes (25, 26), and that the separate chain paths (3, 6) only in a part (2) of the housing extend in a plane (9) common with the outlet openings (5, 7).

2. A door or window operator according to claim 1, characterized in that the hinge parts (19, 20) in each chain link (18) comprise a pin member (19) of substantially hook-shaped cross section and a guide member (20) form-fitting therewith, said guide member being open at at least one of a pair of opposite side faces (23, 24) of the chain link (18).

3. A door or window operator according to claim 2, characterized in that the rotational axes (25, 26) of the hinge parts are substantially perpendicular to said opposite side faces (23, 24).

4. A door or window operator according to claim 2, characterized in that the pin member (19) and the guide member (20) of each of the chain links (18) has a length (b) which is equal to or bigger than the distance (a) between the rotational axes (25, 26) of a chain link with neighbouring chain links.

5. A door or window operator according to claim 2, characterized in that the drive member for each of the two chain members (21, 22) comprises at least one worm member (11, 12) with opposite pitch direction placed in the housing on each side of the respective outlet opening (5, 7) and mounted on a shaft (13) common to both drive members which is parallel to said plane (9) common to the outlet openings, said worm members (11, 12) being provided with helical ribs (17) in engagement with a helically shaped groove (29, 30) in a guide face (28) of each of a number of succeeding chain links ( 18) in each chain member.

6. A door or window operator according to claim 5, characterized in that the chain links (18) in the two chain members are mutually identical but arranged in mirror symmetry, and that said grooves (29, 30) are provided in said opposite side faces (23, 24) of each chain member.

7. A door or window operator according to claim 6, characterized in that said grooves (29, 30) in the chain links

(18) are open partly towards each of said side faces (23, 24), partly towards an adjacent guide face (28) opposite the back surface (27).

8. A door or window operator according to claim 7, characterized in that the chain paths (3, 6) are defined by elevated portions (10) serving as guides for the chain links (18) and that the chain links (18) in said guide face (28) are provided with a protruding guide rib (31) for abutment on the adjacent elevated portion (10) of at least one of the chain paths.

9. A door or window operator according to claims 8, characterized in that the guide rib (31) in said guide face (28) is inclined with a pitch (v) corresponding to the pitch of said ramp (3d).

10. A door or window operator according to claim 5, characterized in that the housing has upper and lower housing parts and that the worm members (11, 12) with said common shaft (13) extend substantially in a partition wall (14) between said upper and lower housing parts (1, 2) and engage the chain members through openings (15, 16) in said partition wall (14).

11. A door or window operator according to claims 1, characterized in that said engagement members in the back surface (27) of each chain link comprise a protruding cam (32), which at one end has a recess (33) and at the other end a pin member (34), said recess (33) and pin member (34) on a chain link in one chain member of the joined operator member engaging a pin member (34) and a recess (33), respectively, in the back surfaces (27) of two neighbouring chain links (18) in the other chain member.

12. A door or window operator according to claim 11, characterized in that on the back surface (27) of each chain link (18) in extension of said protruding cam (32) an abutment (36) is provided for the protruding cam (32) from the back surface of an adjacent chain link in the other chain member.

13. A door or window operator according to claim 1, characterized in that the chain paths (3, 6) are defined by elevated portions (10) serving as guides for the chain links (18) and that each chain link in its back surface (27) outside said protruding cam (32) has a curved guide surface (37).

14. A door or window operator according to claim 13, characterized in that each chain path (3, 6) comprises substantially linear portions (3a, 3c, 3e; 6a, 6b) connected through substantially particular curve sections (3b, 6c) (3a, 6c) having a curvature corresponding to said curved guide surface (37).

15. A door or window operator according to claim 1, characterized in that said plane (9) common with the outlet openings is formed by a lower housing part (2), one chain path (6) extending in its entirety in said lower housing part (2), whereas the other chain path (3) over a substantial part (3a–3c) of its length extends in an upper housing part (1) overlapping said one path (6) and continuing in said plane common with the outlet openings via a ramp (3).

16. A door or window operator according to claim 1, characterized in that outside said housing part the chain paths (38) are helical with an axis substantially perpendicular to said plane common with the outlet openings.

\* \* \* \* \*